United States Patent [19]

Pithouse et al.

[11] Patent Number: 4,940,820

[45] Date of Patent: Jul. 10, 1990

[54] WRAPAROUND RECOVERY ARTICLE

[75] Inventors: Kenneth B. Pithouse, L'Ermieage, France; Thomas A. Kridl, Union City; James T. Triplett, Livermore, both of Calif.; Marc Wille, Baal, Belgium

[73] Assignee: Matsushita Electric Industrial Co., Ltd., Osaka, Japan

[21] Appl. No.: 97,376

[22] Filed: Sep. 16, 1987

Related U.S. Application Data

[63] Continuation of Ser. No. 891,420, Aug. 1, 1986, abandoned, which is a continuation of Ser. No. 567,126, Dec. 30, 1983, abandoned.

[30] Foreign Application Priority Data

| Jan. 6, 1983 | [GB] | United Kingdom | 8300223 |
| Jul. 23, 1983 | [GB] | United Kingdom | 8319855 |
| Aug. 16, 1983 | [GB] | United Kingdom | 8322004 |

[51] Int. Cl.$^5$ .............................................. D03D 3/02
[52] U.S. Cl. .................................... 428/34.9; 112/440; 112/441; 156/86; 174/DIG. 8; 264/342 R; 428/36.1; 428/66; 428/102; 428/121; 428/122; 428/192; 428/193; 428/257; 428/258; 428/259; 428/343
[58] Field of Search ................ 112/440, 441; 156/86; 264/342 R; 174/DIG. 8; 428/102, 121, 122, 36, 57, 66, 192, 193, 257, 258, 259, 343, 355, 34.9, 36.1

[56] References Cited

U.S. PATENT DOCUMENTS

| 2,972,000 | 2/1961 | Boriolo | 136/43 |
| 3,253,954 | 5/1966 | Banas | 136/54 |
| 3,266,935 | 8/1966 | Boriolo | 156/86 |
| 3,296,047 | 1/1967 | Parr | 156/86 |
| 3,379,218 | 4/1968 | Conde | 138/99 |
| 3,455,336 | 7/1969 | Ellis | 138/156 |
| 3,466,210 | 9/1969 | Wareham | 156/86 |
| 3,473,576 | 10/1969 | Ammeus | 139/420 |
| 3,542,077 | 11/1970 | Muchmore | 138/99 |
| 3,669,157 | 6/1972 | Woodall et al. | 139/387 |
| 3,945,493 | 3/1976 | Cardinal | 206/386 |
| 4,024,002 | 5/1977 | Lott | 156/85 |
| 4,095,760 | 6/1978 | Sommer et al. | 244/123 |
| 4,148,957 | 4/1979 | Berger et al. | 428/36 |
| 4,190,485 | 2/1980 | Takeda et al. | 156/583.9 |
| 4,281,211 | 7/1981 | Tatum et al. | 174/36 |
| 4,282,397 | 8/1981 | Siedenburg et al. | 174/92 |
| 4,356,046 | 10/1982 | Yamazaki et al. | 156/86 |
| 4,576,666 | 3/1986 | Harris et al. | 428/102 |

FOREIGN PATENT DOCUMENTS

| 8912 | 3/1980 | European Pat. Off. |
| 23418 | 2/1981 | European Pat. Off. |
| 056080 | 7/1981 | European Pat. Off. |
| 42262 | 12/1981 | European Pat. Off. |
| 0046346 | 2/1982 | European Pat. Off. |
| 52-56393 | 6/1977 | Japan |
| 1005951 | 9/1965 | United Kingdom |
| 1062585 | 3/1967 | United Kingdom |
| 1266719 | 3/1972 | United Kingdom |
| 1332166 | 10/1973 | United Kingdom |
| 1420330 | 1/1976 | United Kingdom |
| 1431167 | 4/1976 | United Kingdom |
| 1491602 | 11/1977 | United Kingdom |
| 1497051 | 1/1978 | United Kingdom |
| 2022010 | 12/1979 | United Kingdom |
| 2059873 | 4/1981 | United Kingdom |
| 2069773 | 8/1981 | United Kingdom |
| 1604439 | 12/1981 | United Kingdom |
| 1604440 | 12/1981 | United Kingdom |
| 1604981 | 12/1981 | United Kingdom |

*Primary Examiner*—James J. Bell
*Attorney, Agent, or Firm*—Spencer & Frank

[57] ABSTRACT

A recoverable article comprising a recoverable fabric, optionally with a matrix material, is provided with a closure whereby it can be retained in the wrapped around configuration. The article is suitable for environmentally protecting cables and pipes and joins therein.

50 Claims, 5 Drawing Sheets

FIG_1
(PRIOR ART)

FIG_2

FIG_3a

FIG_3b

FIG_4

FIG_5

FIG_6

FIG_7

FIG_8a

FIG_8b

WRAPAROUND RECOVERY ARTICLE

This application is a continuation, of application Ser. No. 891,420, filed 8/1/86, which is a continuation of U.S. Ser. No. 567,126 filed 12/30/83 both now abandoned.

This invention relates to recoverable articles, in particular to heat-recoverable articles.

A heat-recoverable article is an article the dimensional configuration of which may be made substantially to change when subjected to heat treatment. Usually these articles recover, on heating, towards an original shape from which they have previously been deformed, but the term "heat-recoverable", as used herein, also includes an article which, on heating, adopts a new configuration, even if it has not been previously deformed.

In their most common form, such articles comprise a heat-shrinkable sleeve made from a polymeric material exhibiting the property of elastic or plastic memory as described, for example, in U.S. Pat. Nos. 2,027,962; 3,086,242 and 3,597,372. As is made clear in, for example, U.S. Pat. No. 2,027,962, the original dimensionally heat-stable form may be a transient form in a continuous process in which, for example, an extruded tube is expanded, whilst hot, to a dimensionally heat-unstable form but, in other applications, a preformed dimensionally heat stable article is deformed to a dimensionally heat unstable form in a separate stage.

In the production of heat recoverable articles, the polymeric material may be cross-linked at any stage in the production of the article that will enhance the desired dimensionally recoverability. One method of producing a heat-recoverable article comprises shaping the polymeric material into the desired heat-stable form, subsequently cross-linking the polymeric material, heating the article to a temperature above the crystalline melting point or, for amorphous materials the softening point, as the case may be, of the polymer, deforming the article and cooling the article whilst in the deformed state so that the deformed state of the article is retained. In use, since the deformed state of the article is heat-unstable, application of heat will cause the article to assume its original heat-stable shape. A further method comprises deforming a substantially non-crosslinked polymeric material at a temperature below the crystalline melting point or softening point of the material, fusing together parts of the material or a part or parts of the material and at least one other polymeric component to produce the configuration of at least one hollow heat-recoverable article and subsequently cross-linking the substantially non-cross-linked material.

In other articles, an elastomeric member is held in a stretched state by a second member, which, upon heating weakens and thus allows the elastomeric member to recover. Heat-recoverable articles of this type are described, for example, in British Patent No. 1,440,524 in which an outer tubular elastomeric member is held in a stretched state by an inner tubular member.

Heat-recoverable articles have found particular use in the environmental protection of elongate substrates such as for example splices in telecommunication cables.

In addition to making the environmental seal the sleeve may be required to withstand an internal pressure, either because the complete splice enclosure is pressure tested for leaks, for example in the Bell cycle and British Telecom specifications, or because temperatures reached in service create a significant internal pressure. Whereas the known heat-recoverable sleeves are quite suitable for the conditions encountered with distribution splice enclosures, many larger telecommunication cables are internally pressurised to exclude moisture and the thicker-walled or reinforced sleeves which would be required to withstand such pressures long term are more difficult and expensive to manufacture and require greater skill to install in the field.

It is often convenient to be able to install a recoverable article by wrapping it around the substrate thus avoiding totally severing the substrate. An example of this is during repair to a multi-conductor telephone cable: only a small number of the many conductors may be affected, and much time would be lost if the entire cable had to be severed in order to install a new tubular enclosure over the cable. Wrap-around products are also useful where space is limited: a wrap-around sleeve can be installed where the length of substrate accessible merely equals the width of the sleeve; a tubular sleeve however requires room for it to be shifted along the substrate away from the splice region while the splice is being made.

Closures for recoverable wraparound articles have been known for many years and are described in the patent literature. Adhesives in general cannot resist the very large forces which can be generated during recovery of the article, and it has been found necessary for most applications to employ a wraparound sleeve provided with profiled edge regions, which can be engaged to form a mechanical closure. Although many such proposals are known, for its ease of assembly in the field, its strength and longitudinal flexibility under recovery conditions, the closure of Ellis U.S. Pat. No. 3,455,336 remains the only commercially successful design.

In one embodiment, a sleeve is provided with an integral ridge or protuberance running along each longitudinal edge. These two ridges are brought together and held together by a channel of generally C-shaped cross-section to maintain the sleeve in the wrapped-around configuration. The sleeve may be made by moulding or extruding a tubular member having a ridge or protuberance on the internal surface, slitting the member and the ridge along the length of the ridge, and turning the member inside out. The ridges preferably have a neck in cross-section in order that the channel be retained during recovery of the sleeve. The precise cross-sectional shape of the ridges should be chosen in conjunction with the shape of the channel, and the sleeve can thus be moulded to the shape desired. The wrap-around system disclosed in this patent is the only one that has enjoyed wide commercial success to date.

The Ellis wraparound article is however expensive to manufacture and requires a large capital investment in fabrication and expansion equipment. In addition, as previously mentioned, the sleeve may be required to withstand relatively high internal pressures, for example in enclosing pressurised telecommunications cable splices, and cannot easily be reinforced by conventional techniques.

Heat shrinkable tubular fabric articles have also been known for a very long time. For example, Japanese laid open patent application No. 52-56393 to Sumitomo Electric Industries discloses a heat-recoverable braided resin tube which is installed over a wire bundle to produce a harness. Branch wires from the wire bundle can apparently be accommodated by drawing them out through the mesh at appropriate points. When the wires are installed the recoverable tube is heated to cause it to shrink down into tight contact with the wires.

It has also been proposed, in U.S. Pat. No. 3,669,157 to Carolina Narrow Fabric Company and in Japanese Patent No. 53-13805 to Matsushita, to provide heat-shrinkable tubular fabric articles which may be impregnated with certain thermosetting resins.

These tubular fabric articles may be reinforced, as described in U.S. Pat. No. 3,669,157, but have not met with commercial success for various reasons. Only tubular articles are disclosed in these references and they therefore require access to a free end of the substrate for installation.

The present invention provides a recoverable wrap-around article which comprises a recoverable fabric cover portion, the fabric having a recovery ratio of at least 20% and edge regions provided with a mechanical closure for maintaining the edge regions in proximate relationship during recovery of the cover portion.

Recovery ratio, when expressed as a percentage, means the change in a dimension as a percentage of the dimension before recovery. The figure should be measured by determining the change that occurs on a single treatment by the appropriate agency such as heat, and not repeated and prolonged treatment over a long period of time. We prefer the recovery ratio of the free fabric to be at least 40%, especially at least 50%, particularly at least 75%.

Fabrics can often have significant advantages when used as recoverable wrap-around articles, especially when used for environmmental sealing. Fabrics can provide excellent pressure retention due to their ability to accommodate hoop stresses. They are also highly resistant to cut or scratch damage due to their poor notch propagation. Also, they can easily be built up from or reinforced by fibres whose chief property is tensile strength. Glass and Kevlar (a trade name for an aromatic polyamide) are particularly useful. Such strength fibres will generally run transverse to the recoverable fibres and will thus give the wrap-around article considerable axial strength. They will also make a contribution to radial strength since radial expansion cannot occur without tension in the longitudinal fibres.

In one embodiment, the recoverable fabric of the invention preferably forms part of a dimensionally heat-recoverable article comprising a composite structure of the heat-recoverable fabric and a polymer matrix material wherein:

(a) the heat-recoverable fabric comprises fibres that will recover when heated, the fibres having a recovery stress Y of at least $5 \times 10^{-2}$ MPa at a temperature above their recovery temperature; and (b) the polymer matrix material has an elongation/-temperature profile such that there exists a temperature (T) which is at or above the recovery temperature of the fibres at which temperature the polymer matrix material has an elongation to break of greater than 20% and a 20% secant modulus X of at least $10^{-2}$ MPa (measured at a strain rate of 300% per minute), and at which temperature the inequality (1) is satisfied:

$$\frac{X}{Y} \cdot \frac{(1-R)}{R} \text{ is less than one} \quad (1)$$

wherein R is the mean effective volume fraction of heat-recoverable fibres in the composite structure along a given direction based on the total volume of the composite structure, or relevant portion thereof.

In a further embodiment, the recoverable fabric of the invention provides the recoverable fibres of a recoverable composite structure comprising a cross-linked polymeric material and cross-linked recoverable fitres by virtue of which the composite structure is recoverable.

Such a recoverable composite structure can be made by applying to the cross-linked recoverable fibres the polymeric material, and then cross-linking the polymeric material.

The fibres may be cross-linked to increase their post-recovery strength, and a recovery stress of at least 1 MPa, preferably 1.5 to 5 MPa will be suitable. The polymeric material is desirably cross-linked to prevent it dripping or running during heat recovery, particularly by means of a torch. Too much cross-linking of the polymeric material will, however, reduce the recovery ratio cf the composite. This may be a problem since a different of cross-linking treatment may be required in the fibres and the polymeric material. This is a reason for the two cross-linking steps being carried out separately above. The problem may arise due to different cross-linking responses (beam response in the case of irradiation cross-linking) of the materials used for the fitres and the polymeric material, or due to the treatment undergone by the fibres and polymeric material. This second effect includes the reduced beam response that of the fibres that results from their orientation produced by drawing to make them recoverable.

The composite structure may, nonetheless, be produced using a single cross-linking step if the beam response of the recoverable fibres relative to that of the polymeric material is such that a post-irradiation recovery stress of the fibres, per se, of at least 1 MPa can be reached before the recovery ratio of the composite structure is reduced to a value of 70% of that of the unirradiated composite structure.

The relative beam response may be produced by the presence of prorads in the recoverable fibres and/or antirads in the polymeric material.

In a preferred embodiment of the invention the fabric is incorporated into a flexible recoverable composite structure comprising the recoverable fabric and a polymeric matrix material laminated thereto, in which:

(a) the recoverable fabric comprises a cross-linked recoverable polyolefin having a recovery stress of 1.5 to 5 MPa; and (b) the matrix is cross-linked such that the recovery ratio available in the composite is at least 65% of that available in the free fabric, and the polymeric matrix material, per se, after irradiation has room temperature elongation 400–700% measured at a strain rate 300% minute.

Irradiation, in addition to providing one means of cross-linking, can provide other features in the composite structure. If the fibres are irradiated, particularly in the presence of oxygen, before application of the polymeric material then a change in the surface properties of the fibres may occur (such as oxidation) which improves adhesion between the fibres and the polymeric material. An irradiation step after application of the polymeric material may also aid such bonding by forming a cross-linked bond between the two components of the composite structure.

Also, or instead depending on the conditions under which the polymeric material is applied, some mechanical interlocking between the fibres and the polymeric material may be provided.

In general the recoverable article of this invention comprises heat-recoverable fibres having a minimum recovery stress of $10^{-1}$ MPa, more preferably $5 \times 10^{-1}$ and usually at least 1 MPa at a temperature above the transition temperature of the fibres. There is no upper limit of recovery stress, but in practice 200 MPa and more usually 100 MPa is the highest figure normally achievable with polymeric fibres. As mentioned above, a range of 1.5 to 5 MPa will be typical.

The fibres are preferably formed from a polymeric heat-recoverable material. Alternatively, a fabric can be made from substantially dimensionally stable fibres and then deformed for example by stretching to render it as a whole recoverable. By the "recovery temperature" of polymeric heat-recoverable materials is meant that temperature at which the recovery of the polymeric material will go substantially to completion. In general, the recovery temperature will be the crystalline melting transition temperature if the polymer is crystalline or the glass transition temperature if the polymer is amorphous.

The heat-recoverable fibres are preferably formed from a polymeric material that imparts good physical properties and, in particular, good creep resistance to the fibres. Olefin polymers such as polyethylene and ethylene copolymers, polyamides, polyesters, acrylic polymers and other polymers capable of being cross-linked may be employed. A particularly preferred polymeric material for the fibres is based on polyethylene having a density of from 0.94 to 0.97/gms/cc, an Mw of from $80 \times 10^3$ to $200 \times 10^3$ and an Mn of from $15 \times 10^3$ to $30 \times 10^3$.

Preferably the recovery temperature of the fibres is 60° C. or more, most preferably from 80° C. to 250° C., such as, for example, 120°–150° C.

When the fibre is cross-linked by irradiation it is convenient to incorporate the cross-linking step into manufacture of the fibre. The fibre can be extruded, stretched at a temperature below its melting temperature, preferably by an amount of from 800 to 2000%, then subjected to irradiation to effect crosslinking. A less preferred way of making the fibre is to extrude the fibre, irradiate to cross-link, then heat the fibre, preferably to above its melting temperature, stretching the fibre, and then cooling the stretched fibre. High density polyethylene fibres are preferably irradiated with a dose of from about 5 to about 35 megarads, preferably from about 5 to about 25 megarads, and in particular from about 7 to about 18 megarads especially from 10 to about 18 megarads. Usually the gel content of the cross-linked fibre is greater than 20%, preferably greater than 30%, most preferably greater than 40%. In practice, gel contents greater than 90% are not easily achievable.

The heat-recoverable fabric can be made of only heat-recoverable fibres as described above or can contain other fibres in addition to the heat-recoverable fibres. Where the fabric contains such other fibres, R in equation (1) relates only to the heat-recoverable fibre component. The fabric can be knitted, woven, non-woven, braided, or the like. The recoverable fibres can form part of the fabric itself as it is made or may be additional and inserted after production of the basic fabric. The fibres of the fabric may be monofilaments or multifilaments, and also staple fibres, wires or tapes. In a preferred embodiment the fabric is a woven fabric. A single ply weave may be used, or where a higher density or thicker fabric is desired a multiple ply weave may be used. The woven fabric can contain only heat-recoverable fibers or it can contain heat-recoverable fibres together with non-heat-recoverable fibres or filaments. For example, the fabric can contain heat-recoverable fibres in one direction and non-heat-recoverable fibers in the other. This produces a heat-recoverable fabric which is recoverable in only one direction. The fabric can be woven in a pattern, for example, twill, broken twill, satin, sateen, Leno, plain, hop sack, sack, matt and various weave combinations. A single layer of fabric may be used or the article may comprise a laminate of two or more layers, optionally bonded together with a simple layer of adhesive or including a thicker layer interposed between the fabrics.

The heat-recoverable fabric is preferably bonded to, and preferably embedded in, a polymer matrix material as mentioned above. At or above the recovery temperature of the fibres the polymer matrix material should be capable of limited flow under pressure so that it retains the integrity of the composite structure without substantially impeding recovery of the fibres. It preferably has, at the aforesaid temperature, an elongation to break of greater than 50%, most preferably greater than 100% especially from 400 to 700%, and a 20% secant modulus of preferably at least $5 \times 10^{-2}$ MPa, most preferably at least $10^{-1}$ MPa, measured at a strain rate of 300% per minute.

The specified properties of the polymer matrix material need not necessarily apply after recovery. Thus, for example, the polymer matrix material may eventually cure to a thermoset on heating, provided that the cure rate is sufficiently slow under the recovery conditions not to affect adversely the above-mentioned physical properties of the polymer matrix material during the recovery of the fibres. However, for many purposes, room temperature flexibility is desirable.

The polymer matrix material can be either a thermoplastic or an elastomer. Examples of the former class of polymers include ethylene/vinyl acetate copolymers, ethylene/ethyl acrylate copolymers, polyethylenes including the linear low, low density and high density grades, polypropylene, polybutylene, polyesters, polyamides, polyetheramides, perfluoroethylene/ethylene copolymer and polyvinylidine fluoride. Considering the second class of materials this can include acrylonitrile butadiene styrene block copolymer, acrylic elastomers including the acrylates and methacrylates and their copolymers, e.g. polybutyl acrylate, and poly 2-ethyl hexylacrylate, the high vinyl acetate copolymers with ethylene (VAE's), polynorbornene, polyurethanes and silicone elastomers and the like. The matrix material can be cross-linked, for example a cross-linked ethylene/vinyl acetate copolymer, linear low density or high density gradopolyethylene or acrylic elastomer. The material can be cross-linked by irradiation or by other means such as chemical cross-linking using, for example, a peroxide cross-linking agent, provided that the physical properties of the matrix at the recovery temperature are as specified after the cross-linking step. Where irradiation is used, a dose of 10 megarads or less, in particular from 3–7 megarads, is preferred. The resulting extent of cross-linking allows the matrix to recover with the fabric and also prevents the matrix running or dripping during heat recovery. The recovery ratio of the composite after irradiation is preferably at least 50% especially at least 70% of that before irradiation. These dose values may be regarded as typical for olefinic polymers such as polyethylene of low orientation, and the skilled man will be able to select suitable dose values depending on the presence of various concentrations of prorads or antirads, if any.

The heat-recoverable fabric is preferably bonded to the polymer matrix material, and this bonding may be adhesive, that is to say by chemical or physical surface interaction, or mechanical interlocking.

Most preferable the heat-recoverable fabric is embedded in the polymer matrix material thereby forming a composite structure. By "embedded" is meant that the polymer matrix material surrounds at least a major portion of the fibre surface area of the fibres making up the fabric.

The fibres are preferably totally surrounded by polymer matrix material, but it is possible and at times desirable that substantially less than the total fibre surface area be contacted by polymer material. Sufficient fibre area should be bonded to the polymer matrix material or interlocked therewith to result in a composite structure which retains its integrity during recovery of the article. For the avoidance of doubt it is here stated that the term matrix is used to include materials which (partially or totally) surround the fibres and also those materials which are merely affixed to a surface of the fabric but which do not penetrate the interstices of the fabric.

Preferably the polymer material at least on the surface of the composite structure facing the source of heat is substantially unstressed and is at least 0.03 mm especially at least 0.2 particularly 0.2 to 2 mm in thickness. Such polymeric material preferably softens during recovery but has a sufficiently high viscosity that it is retained by the fabric. This improves the ability of the composite structure to be heat recovered using a conventional propane torch. A heat-recoverable article having these characteristics is described in UK patent application No. 8300217.

In the composite structure, the ratio of the volume occupied by the heat-recoverable fibres of the fabric to the total volume of the composite is preferably at least about 0.01:1, more preferably from about 0.1:1 to about 0.8:1 and most preferably from about 0.2:1 to about 0.4:1.

In the composite structure the heat-recoverable fibre volume in any given unit volume of composite should be chosen according to the fibre strength, polymer matrix strength and the integrity of the fibre/polymer matrix structure under recovery conditions.

We have found that an acceptable recoverable product results if the inequality (1) mentioned above is satisfied, viz:

$$\frac{X}{Y} \frac{(1-R)}{R} < 1 \qquad (1)$$

wherein X is the 20% secant modulus of the polymer matrix material and Y is the recovery stress of the fibres, both at a temperature T above the recovery temperature of the fibres, and R is the mean effective volume fraction of heat-recoverable fibres in the composite structure.

Preferably $$\frac{X}{Y} \frac{(1-R)}{R} < 0.5 \text{ most preferably} < 0.05.$$

The composite structure can be formed for example by laminating or otherwise applying one or more layers of polymer matrix material to the heat-recoverable fabric. Sufficient heat and pressure is applied so that at least a major part of the fabric is bonded to the polymer matrix material, or so that a significant amount of interlocking occurs. The result is a composite structure which on applicatin of heat recovers as a unit.

Other methods of applying the fabric to the matrix can be used, for example, impregnation, solution coating, slurry coating, powder coating, reactive prepolymers, e.g. acrylic prepolymers activated by UV or peroxide, and the like. In any application method employed sufficient heat to cause the fabric to recover to any significant extent should be avoided, unless the fabric is suitably restrained from recovery.

Since the recoverable fabric cover portion comprises individual recoverable fibres, the fibres at the edge regions must be individually retained in order to prevent unravelling or fraying of the fabric during recovery. Also the recoverable fibres at one of the edge regions to be joined must be secured to the fibres (which may be the other end of the same fibres) at the other edge region in order that the fabric remains in the wrapped around configuration during recovery. The mechanical closure must therefore either grip the fibres directly or grip the matrix; where the closure grips the matrix a good chemical or physical bond or good interlocking must be provided between the fibres and the matrix at each edge. This may be accomplished by a variety of methods.

In one embodiment a composite structure is formed at least at the edge regions. Thus, the individual fibre ends are fixed in the matrix, for example a polymer matrix which has sufficient strength to resist the recovery forces. It is in this case that a bond or interlocking between fibres and matrix is important. The part that cross-linking, particularly irradiation, plays in this has been mentioned above in general terms.

In another embodiment the recoverable fibres of the fabric do not terminate at the edge regions. For example, they may be formed into loops, or the fabric itself looped around, so as to provide a passage for receiving an elongate member, for example a rod, which extends along the edge region.

In yet another embodiment the closure means is adapted to grip a sufficient number of individual fibres in the edge regions, and may be for example a rod which extends along the edge regions so as substantially to prevent them slipping from the closure on recovery and forming a 'run'.

It is also possible to bond profiles on to the edge regions of the article to form, for example, a closure as described in U.S. Pat. No. 3,455,336, and our claims include this possibility, although at present this is not the preferred method of forming the mechanical closure means. Such a bond could be enhanced by cross-linking, especially by irradiation if the closure itself was susceptible to cross-linking. An alternative in some mechanical connection, for example stitching or stapling, between the closure and the article.

The above mentioned embodiments of closures in accordance with this invention will now be discussed in more detail.

The first category is primarily applicable to woven fabrics having recoverable warp fibres. The problem here is that recovery of a simple piece of such fabric is likely to result in the warp fibres slipping through the weft causing fall-off of picks at each end of the fabric: the fabric does not therefore recover as a whole. One solution is to form a composite structure from the fabric by fixing the individual fibre ends in a relatively rigid composition to form closure elements which are fixed relative to the recoverable fibres and which therefore are able to transmit the recovery forces throughout the whole of the fabric.

The fibres may be fixed by coating or impregnating the fabric with a composition which prevents the fabric from unravelling. The composition should be able to retain the integrity of the fabric under those conditions that will be applied to the fabric to cause its recovery. Where, for example, the fabric is heat recoverable, the composition must be suitably heat resistant. The recovery temperature is preferably 60° C. or more, more preferably 80°–250° C., such as 120°–150° C., and the composition should not melt unduly at such temperature. The composition may be a thermoplastic material or an elastomer. Examples of thermoplastic materials include ethylene/vinyl acetate copolymers, ethylene/ethyl acrylate copolymers, LLDPE, LDPE, MDPE, HDPE, polypropylene, polybutylene, polyesters, polyamides, polyetheramides, polyfluoroethylene/ethylene copolymers and polyvinylidene fluoride. Suitable elastomers include ABS block copolymers, acrylic elastomers, VAEs, polynorbornenes, polyurethanes and silicone elastomers. The composition is preferably a cross-linked material, for example cross-linked ethylene/vinyl acetate copolymer, LLDPE, HDPE or acrylic elastomers.

The composition can be applied to the fabric over its entire surface and may be the same as the previously mentioned polymeric material, or it may be applied at localised regions such as edge regions. The composition at these edge regions may act as first and second closure elements, or separate members may be bonded or welded to the composition.

A further possibility is to use the composition at the edge portions of the fabric as a block: in this way a closure member may have projections which pass through the fabric but are fixed by the composition. These projections may pass through the composition as well as the fabric, or just through the fabric at a position immediately inwards of the composition. A base may be provided which carries a series of projections, or the projections may be arranged independently in which case each closure element comprises a set of discrete projections.

The closure elements may interengage or be held together by a separate clamping member, which may for example be a C-shaped channel or a plurality of clamping devices. A variation on this involves the use of a flap or other elongate member having a row of projections on one of its surfaces. The two reinforced edges of the fabric (which in this variation constitute the closure elements) are overlapped when the sleeve is in the wrap-around configuration, and the projections are made to pass through the resulting double thickness of fabric. The projections may have the shape of arrowheads or otherwise be provided with means to prevent their retraction once inserted through the fabric.

The ability of a recoverable fabric composite to be penetrated allows the edge regions to be held together by various means, including the flap with projections mentioned above. Also, various complex tubular articles, such as bends, elbows and tees or branch-offs, may be made from simple tubular articles or from open sheet. In general terms, therefore, two or more portions of composite structure may be joined together by means of a mechanical joining arrangement that penetrates the fabric. The joining arrangement may be one or more lines of stitches or one or more staples. The portions joined together may be discrete or may merely be separate portions of a single piece of composite material. Where stitching is used each line of stitches preferably has from 200–800 stitches per meter, and the line of stitches closest to an edge of the fabric is preferably separated from that edge by at least four rows of fibres and in the case of high float fabrics such as sateens where the high float is perpendicular to the join line, a spacing of at least six rows may be preferred. This will correspond to an edge overlap of at least 8–10 mm, preferably at least 16 or 20 mm for the fabric types preferred. A hem may, of course, be provided but this will increase the thickness of the fabric and this may not be desirable. In order to reduce the possibility of breakage of the heat-recoverable fibres by the stitching (or stapling), the needles (or staples) should be very sharp at their tips and have a maximum used diameter of the same order of magnitude as the distance between the heat-shrink fibres of the fabric.

A further variation on this first category of closure mechanism is as follows. The fabric is laminated or impregnated with a composition to produce a composite sheet, preferably over its entire surface, and edge portions of the resulting sheet are folded over to provide closure members of increased thickness which can be held together by means for example of a closure channel. The composition used for this purpose may be any of those mentioned above for preventing edge portions of the fabric from unravelling in order that closure members may be bonded to the fabric or in order that projections may be forced through the fabric. The treatment of the fabric may therefore be identical in these two cases, and it is the techniques by which generally similarly shaped closure members are made that differ.

The edge portions of the composite sheet may simply be folded over and optionally bonded to form the thickened closure elements. The thickened closure elements may be pre-formed in the factory, or formed on site if need be as part of the installation of the fabric around a suitable substrate. The closure elements may be held together by a third member such as a C-shaped channel which can enclose the two closure elements side-by-side. The two edge regions may be formed such that they interengage, and may optionally be held in interengagement by a further member.

The second category can be considered as including those fabrics in which at least the recoverable fibre is effectively continuous, and does not appear to be a series of independant picks or ends. The most important instances are woven fabrics with recoverable weft made on a shuttle or rapier loom. (A shuttle loom produces a continuous weft in a boustrophedon pattern and a rapier loom can produce a similar effect from independant weft fibres by turning their ends back into the fabric.) This sort of fabric thus has inherent in its structure the means for attaching the closure member.

In one embodiment of this category, a weft-recoverable fabric is woven having considerably thicker warp fibres at its edges than over its central region. The central region will form at least the major part of the wrap-around article, and the thickened edges will form the closure elements to be held together by a closure member or members. In general, it will be necessary for only a single warp thread at each edge of the fabric to be thicker, although if the difference in thickness referred to is only small it may be preferable to employ several thicker fibres at each edge. The thickened edge regions can be regarded as rails as illustrated in U.S. Pat. No. 3,455,336, since when they are brought together with the fabric in the wrapped configuration they show in cross-section a narrower portion adjacent to, and a wider portion remote from, the surface of the fabric A channel, C-shaped in cross-section, may be slid over these closure elements or rails to hold them together. The shape of the rails causes the channel to be retained during recovery of the fabric. Alternatively, a series of clips or clamps, or other means, could be provided spaced along the length of the thickened warp fibres.

A similar result can be achieved by inserting a rod or other elongate member into the weft at each edge region of a weft-recoverable fabric. It is not, of course, necessary that each such rod catches every pick, so long as the recovery forces can be uniformly transmitted to the rods to avoid unwanted buckling, unravelling, or fraying of the fabric on recovery. As before, the two rods, which constitute the closure elements are brought together and held together by, for example, a C-shaped channel. The channel thus grips both rods and the fabric which surrounds them.

Another embodiment within this category is, perhaps, most applicable to knitted or braided fabrics. Here it is the fabric (rather than just the recoverable fibres) which is effectively continuous and can provide, for example, a loop which can trap a rod or other elongate element. As above, two such rods at opposite portions of the fabric are brought together and secured by a C-shaped channel or other means. In one example a fabric is knitted having a central portion of single thickness and edge portions of double thickness which are formed as closed loops. The fabric would thus have the shape of a dumb-bell in cross section. The fibre from which it is knitted may be recoverable, the fabric may have a warp or weft insertion of a recoverable fibre running from one of the loops to the other, or a stable fabric may be expanded or these ideas may be combined. An alternative to this is to produce a tubular fabric (by braiding, knitting or triaxial weaving, for instance) that has at least a component of recoverability running circumferentially, to flatten such a tube, and to use the flattened tube as a wrap-around sheet. A rod, for example, may be inserted into the tube adjacent what is now each edge of the recoverable sheet. The two rods can be secured together to hold the flattened tute in a wrapped around configuration.
Such a rod may be of any material which is sufficiently rigid in the installed product, such as a metal or plastic.

The present invention also envisages a method of forming this type of closure element. A recoverable composite is folded over at an edge region to provide a loop, and this loop is held in a vice. A support is provided within the loop and the looped part of the composite is then recovered. During recovery, the loop may be deformed to give it a desired shape. It has been found that the resulting closure member retains its shape on removal from the vice (this may be ensured by precoating the internal surface of the loop with an adhesive)-,and since the portion of the composite that constitutes the closure member becomes dimensionally stable it has reduced tendency to pull out of any channel or closure means during recovery of the fabric article during its installation. The closure thus produced is new and this closure and its method of manufacture may be applied to recoverable wrap-around articles other than the fabric articles described herein.

In the third category the closure means comprises teeth, clamping bars, pressure plates, or other frictionally engaging means for gripping the individual fibres in the edge regions. Suitable closure means of this type are described and claimed in copending UK patent application Serial No. 822568 (Molinari).

Reference is made to the closure elements being situated at edge regions of the article, rather than at edges themselves since we wish to include also the provision of closure elements spaced some distance from the edges. When the wrap-around article is used for environmental sealing it may be desirable to provide a seal (generally known as a flap) between the two edges of the fabric which are brought together when the fabric is in the wrap-around configuration. Such a seal can conveniently be provided by that portion of the fabric which lies between the extreme edge and the adjacent closure member.

Instead of providing the flap as an integral part of the sleeve, it may be separate. In this way the functions of holding the sleeve edges together and of providing a seal can more readily be separated. This allows the various components to be optimised for their respective jobs. A separate flap is arranged to lie across the abutting or overlapping edges of the article and to be bonded to the edges. We have found that there are two requirements for a good permanent seal. Firstly the flap, the article and the adhesive must be chemically compatible to ensure a good bond or seal. Secondly, the moduli of the flap and the adhesive must be compatible if adhesion to the flap is not to fail during recovery of the article. The bond can be improved by surface treatment of the flap, for example by corona treatment or flame brushing, and by a good coating technique such as hopper coating. The adhesive is preferably an EVA or polyamide based hot-melt adhesive, particularly a polyamide having up to 10% of an acrylic rubber, based on the weight of the polyamide. We have found excellent results using a non-recoverable EVA based flap, especially one based on a blend of different EVAs. The EVA should be beamed to a low dose, to retain a low modulus, comparable to that of the adhesive but sufficiently high to provide strength. The moduli of the flap and the adhesive preferably differ by less than 20%, more preferably by less than 10%, most preferably by less than 5%, based on whichever is the larger. This technique for providing a flap is applicable to continua as well as to fabrics, and also to intergral flaps.

The closure elements may run substantially continuously along the edge regions or there may be a series of separated closure elements. An advantage of the closure elements being discontinuous is that the resulting article may have greater flexibility: this is useful where the article is to be shrunk down over a substrate of non-uniform cross-sectional size since the closure elements will be able to follow an irregular underlying shape.

The closure elements may, by virtue of their shape, interlock or otherwise mechanically engage to hold the two edge regions of the fabric together during recovery. An example of such a closure is a zip. Each closure element can be regarded in such a case as possessing a feature which fixes it relative to the recoverable fibres at one edge region, and a feature by means of which it is engaged to the other closure elements. The fixing of the closure to the fabric may comprise sewing or stapling where the fabric forms part of a recoverable composite, or where other mean for preventing unravelling is provided.

In another arrangement there may be a separate closure member which holds the two closure elements together, or which holds them a certain fixed distance apart. The two ideas can of course be combined, in which case the closure elements may interlock and be reinforced by a closure member.

Whatever the closure mechanism, it will often be desirable to coat the fabric on that surface which will be inwardly facing when the article is in the wrapped configuration with a sealant, such as a mastic, or an adhesive such as a heat-activatable, particularly hot-melt-,adhesive. Such a coating may be additional to the matrix referred to above for rendering the fabric substantially impervious, or it may be used alone. Alternatively, it is possible that the matrix may have sufficient deformability or tackiness, preferably only at elevated temperatures, to act as a sealant or adhesive. The presence of an adhesive or sealant is of particular use when the fabric article is to be used for environmental sealing.

It may be found useful to provide means for indicating when complete recovery of the fabric has occured or when any internal adhesive coating has been properly activated. Where the fabric is heat-recoverable and the adhesive is heat-activatable, such means may be a mechanical device held in a biassed configuration by a material which releases it at a certain temperature or it may be a composition such as a paint or ink which changes colour at the required temperature. Such a composition is preferably applied to an exteral surface of the fabric article.

Heat recoverable articles according to the invention comprising interwoven reinforcing fibres have been found to be particularly suitable for use in enclosing a splice between pressurized telecommunication cables. The recovered article is exceptionally resistant to the effects of pressure and preferred embodiments have sufficient hoop strength to resist rupturing under 70 KPa pressure (the pressure typically used in pressurized telecommunication systems) at ambient temperatures of such systems. When the fabric is used in conjunction with a matrix material or polymeric coating it can easily provide sufficient imperviousness to retain such pressure over long periods of time. The closure mechanism will be chosen according to the desired degree of imperviousness, and the various flap systems described have been found to be ideal. Other uses include the repair to lengths of cable or the repair or protection of pipes or pipe joints for, say, gas oil or air. A further use is in attaching, for example, a cable or a pipe to an elongate substrate. Due to the length of the cable, pipe, or substrate, the attachment means is desirably of the wrap-around type. In many cases, such attachment must withstand severe mechanical and environmental stresses, and we have found that the article of the invention is particularly suitable. One example of this type of use is the attachment of heating cables to the rotors of helicopters. Here considerable centrifugal forces must be withstood under adverse weather conditions. The article of the invention has been found to function reliably.

The invention will now be further illustrated with reference to the accompanying drawings, in which.

Figure 1:
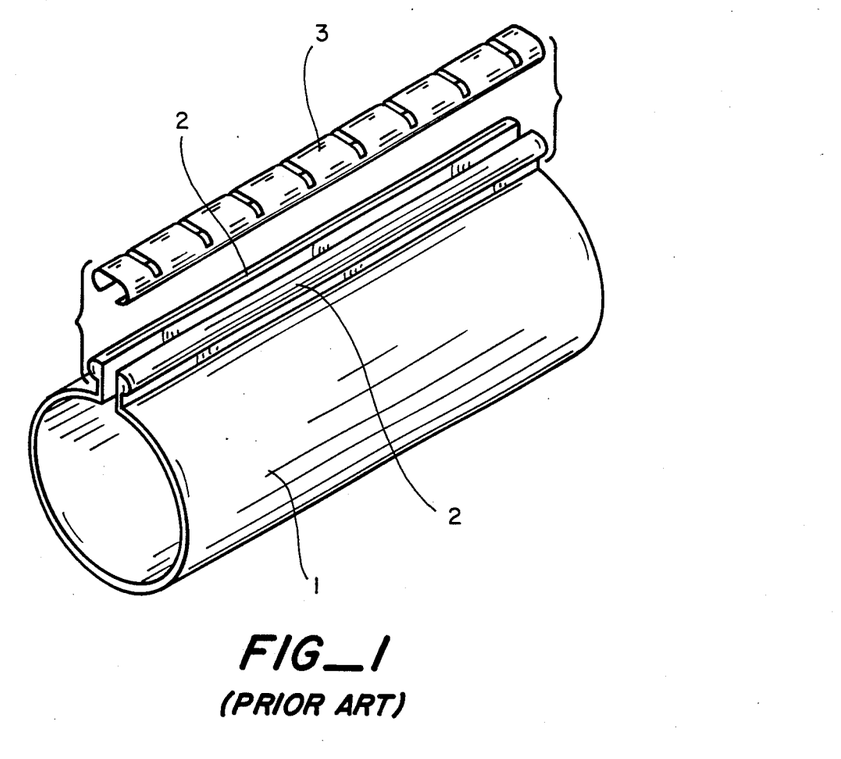
FIG. 1 shows a known extruded wrap-around recoverable sleeve and a closure channel.
Figure 2:
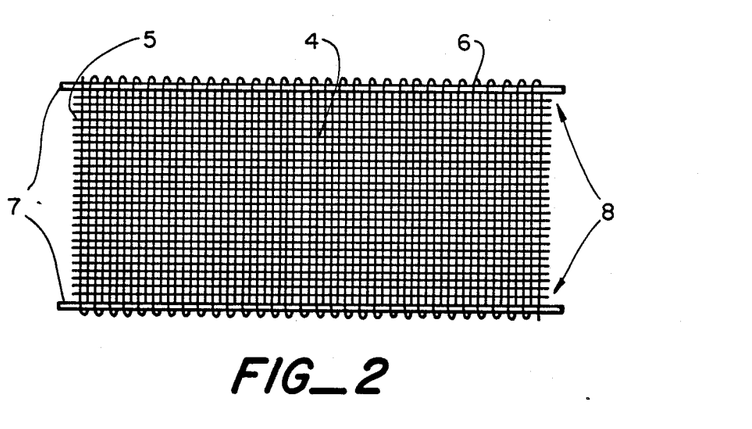
FIG. 2 shows a piece of recoverable fabric, with closure elements.

FIG. 1 is prior art. It shows a recoverable wrap-around sleeve 1 which has been extruded with integral closure rails 2. The rails are brought together to bring the sleeve into the wrap-around configuration, and held together by a closure channel 3 of substantially C-shaped cross-section. Such a sleeve is conveniently used for environmental protection of substrates such as cables or pipes. The sleeve is wrapped around the substrate and recovered, in this case by shrinking, to produce a tight fit. The sleeve may be coated on its inner surface with a sealing material to enhance the environmental protection provided. The sleeve may be heat-recoverable and the sealing material a heat-activatable adhesive so that the single step of heating causes recovery of the sleeve and activation of the adhesive.

FIGS. 2-8 illustrate the invention, and in the first of them is shown a recoverable woven fabric 4. The fabric comprises a warp 5 and continuous recoverable weft 6. Closure elements 7 are provided at edge regions 8 of the fabric, and a channel such as that shown in FIG. 1 could be used to hold them together In this embodiment, the means by which the closure elements are fixed relative to the recoverable fibres is inherent in the nature of the fabric since closure elements are threaded into the continuous weft and are trapped by it. Recovery of the weft will therefore draw the two closure elements together. It will generally be desirable that the closure elements are substantially rigid and if the bulk of the fabric is to be flexible, the closure elements are preferably rods inserted into the fabric after weaving. It is not of course necessary that the rods catch every weft fibre, and the number of connections required between the rods and the weft will depend on the recovery force of the fibres. The closure elements may be provided by one or more warp ends of extra thickness used at each edge region 8 of the fabric.

Figure 3A:
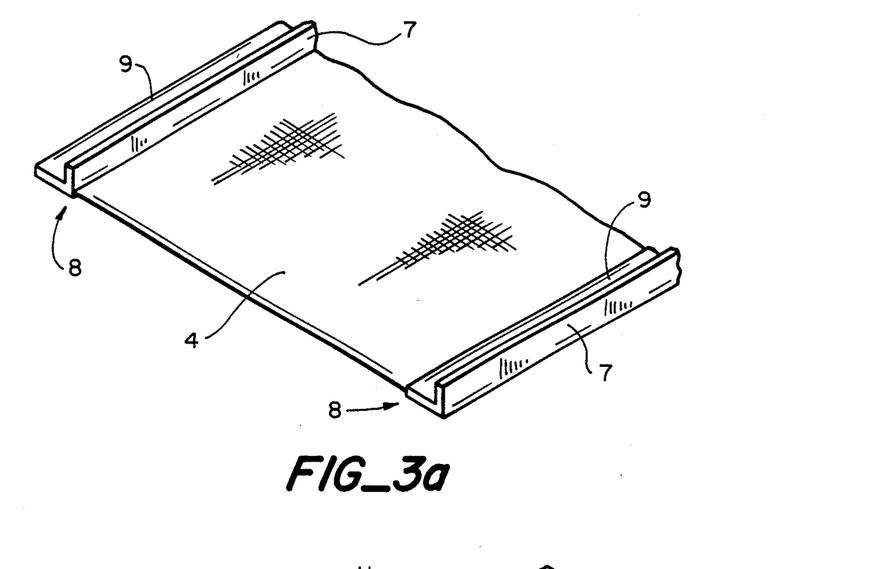
FIGS. 3a and b show, an alternative arrangement for securing closure elements to a recoverable fabric and a closure member.
Figure 3B:
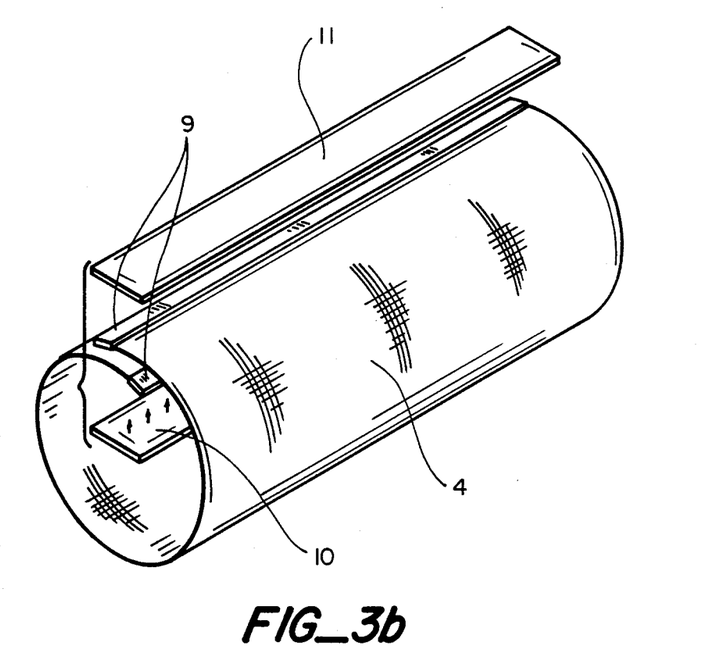

An alternative technique for fixing the closure elements is shown in FIG. 3a and 3b. This technique is applicable to all fabrics, and is especially applicable to knitted fabrics and warp-recoverable woven fabrics. Here edge region 8 of the fabric 4 is provided with a composition 9 which prevents the edges of the fabric from unravelling. The extent to which this composition is required will depend on how far from the edges of the fabric the closure elements 7 are to be provided since the friction between the fibres will reduce pull-out of the closure elements.

With reference to FIG. 3a the closure elements 7 may, for example, be bonded, welded, sewn or stapled to the edge regions 8 that have been reinforced with the composition 9. Alternatively, the closure elements themselves may have projections which pass through the fabric. These projections may pass through the composition as well as the fabric, or just through the fabric at a position immediately inwards of the composition. The composition, which is preferably a cross-linked polymeric material, may extend over the whole surface area of the fabric, or may be localized at least at the edges as drawn. The composition may merely be adhered to one or both surfaces of the fabric or it may form a matrix in which the fabric extends.

The situation in FIG. 3b is similar, but here a series of projections is provided on a flap 10. This flap 10 is the means for maintaining the first and second closure elements together. The closure elements in this case being the edge regions that have been reinforced by composition 9. A cover 11 may be provided to engage the projections on the flap 10 to ensure it remains properly in position. It is not necessary, although is may sometimes be desirable, to preform holes in the fabric for the projections of the flap 10 (FIG. 3b) or of the closure elements 7 (FIG. 3a). In general the projection may be sharp so that they can be forced through the fabric at the position desired, thus allowing the extent of overlay of the fabric to be chosen in the field. Although a few of the fibres may be damaged in this operation many of the projections will simply pass through the interstices of the fabric, and in any case the very low tendency of cuts in such fabric to propagate means that such damage is unlikely to be a problem. The ability to choose the unrecovered size of the article by selecting in the field the extent of overlap this way provides a considerable advantage of the use of fabrics for wrap-around articles.

Figure 4:
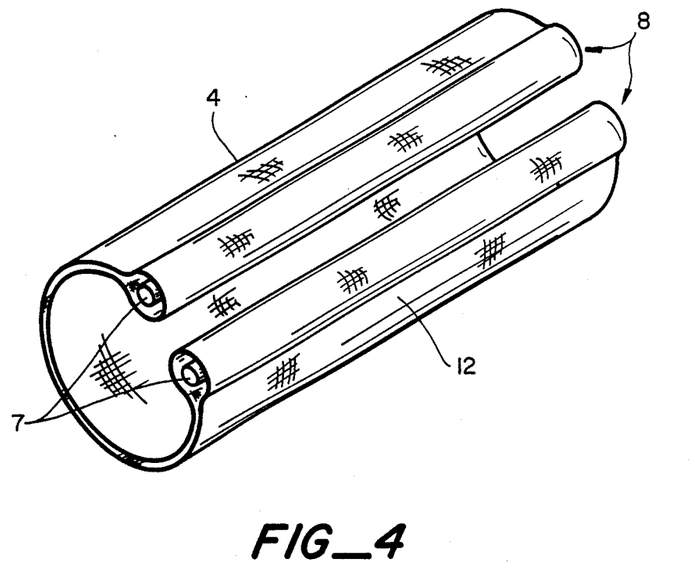
FIG. 4 shows a flattened recoverable fabric tube containing closure elements.
Figure 5:
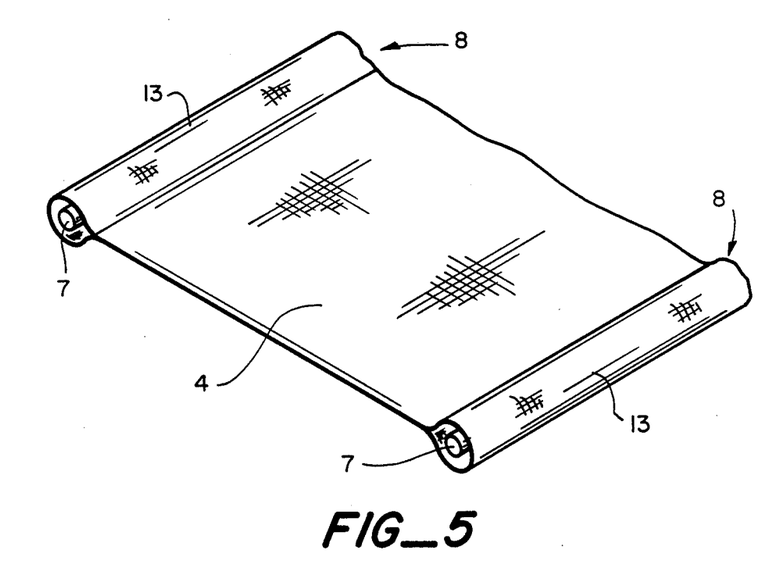
FIG. 5 shows a recoverable fabric incorporating loops for housing closure elements.

In FIGS. 4 and 5 the fabric is effectively continuous and can provide a loop closed in cross-section to accommodate rods or other closure elements. The embodiment of FIG. 4 is particularly applicable to braids, tubular knits and triaxial weaves. The fabric 4 is produced as a tube. The tube is flattened at then regarded as a flat sheet having loops at its edge regions 8 into which are inserted closure element 7. The two closure elements 7 may then be held together by a separate closure channel or other fastener. If desired the closure elements 7 may project from each end of the loops and be joined together remote from the sheet, although it has been found preferable to use a closure channel which overlies the fabric along the whole of the edge regions 8 and no serious damage to the fabric is found to occur.

A variation on this idea is shown in FIG. 5, but here the central web of fabric 4 is of single thickness, and a closed loop 13 is provided at each edge regions 8. The loops 13 house the closure elements 7. This dumbbell shaped fabric may be manufactured integrally by, for example, knitting.

Figure 6:
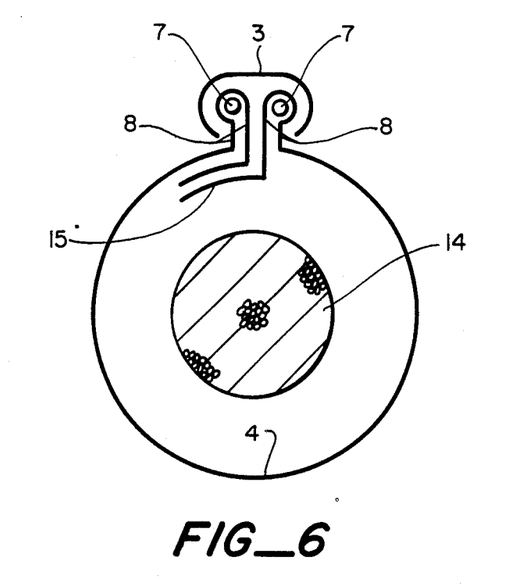
FIGS. 6 and 7 show two arrangements whereby edge regions of a recoverable sleeve are held by a closure channel member.
Figure 7:
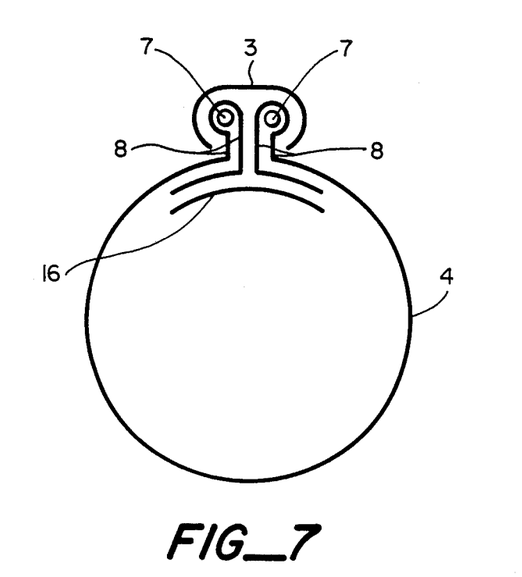

In FIGS. 6 and 7 the support rods 7 are accommodated by folding over edge regions 8 of a recoverable fabric 4. The rods 7 and overlying fabric are held together by a closure channel 3. We have found, contrary to expectations, that the arrangements shown are able to resist recovery forces of considerable magnitude. The inventive arrangements of closure shown, in these figures are applicable to recoverable continua as well as to fabrics.

In each of these figures a flap is provided underlying the abutting rods 7, the purpose of which is to block any leak path. In FIG. 6 the flap 15 is integral with the fabric 4 and is simply that part of the fabric between an extreme edge of the fabric and one of the closure rods 7. In FIG. 7 a separate flap 16 is provided, and the modulus of the flap and of the adhesive bonding it to the fabric are preferably substantially equal as mentioned above. In FIG. 6 the fabric is shown around a cable 14, and when recovered the fabric will shrink down into engagement with the cable to provide an environmental seal. The fabric, preferably in combination with a composition that renders it impermeable to air, may be used to protect a variety of substrates such as cables, cable splices and pipes. Where a cable splice, or other irregularly shaped substrate is to be protected, a splice case may be constructed by providing a liner around the substrate and within the fabric sleeve. See for example UK patent No. 1431167 and published patent application Nos. 2059873 and 2069773. Such a liner in general has a central region of larger cross-section and end regions which taper down to the cables, thus providing a smooth transition from the large central splice bundle to the smaller cables. In such a situation, where the substrate is of non-uniform size, the fabric may have zones of different recovery ratios so that the unresolved recovery is, say, uniform over the entire substrate. This may be achieved by using different fabrics, or a single fibre type that has been differentially treated such as by subjecting it to different degrees of irradiation. Where such a splice case is intended to be able to retain a significant pressure, means are preferably provided at each junction between the fabric and the underlying cable to put the bond between them out of peel. Such means may, for example, present a concave surface to pressure within the splice case thereby overcoming the forces that would cause peel. A branch-out between two or more cables, particularly telecommunications cables, may be sealed with the recoverable fabric article of the invention, and means may be provided to hold together circumferentially spaced regions of the fabric between the diverging cables. A suitable means for doing this is a two or three pronged clip which is positioned over an end of the fabric sleeve between the cables, see for example UK Patent No. 1604981.

An alternative to a clip is to install around the cables a flexible seal which comprises an envelope which can undergo a change from lower to higher viscosity. The seal transforms the concave surfaces in the crutch region to a flat or convex surface to which the fabric article can seal. This seal is disclosed in copending UK patent application No. 8221597.

The problem of branch-off can, however, be overcome by producing the fabric sleeve in the correct shape to accommodate two or more branching substrates. This solution is particularly applicable to fabrics, and offers significant advantages. A fabric can be produced, especially by knitting, which has for example one outlet at one end and two at another end. Such an article may still be wrap-around since closure mechanisms can be provided for each outlet where the substrate to be accommodated has no accessible end. Where splices to drop wires are to be sealed the conduits for the main cable are preferably wrap-around, and the conduit for the drop wire tubular.

The closure elements at regions 8 shown in FIGS. 6 and have been formed by folding over edges of the fabric around support rods 7. The support rods should be substantially rigid or non-compressible under the conditions at least of installation of the finished product. The support rods 7 are preferably rods which extends the length of the closure member 3. Suitable materials are solid plastics or metals, or thermosetting adhesives.

Splice cases formed from a recoverable fabric composite and closed by these closures were subjected to 100 cycles of each of the Bell and British Telecom tests. In the first of these tests a splice case in air at 70 KPa is subjected to an eight hour temperature variation between −40° and +60° C. In the second test the splice case is in water, at 105 KPa and subjected to a four hour cycle between +5° and +50° C. No leaks were observed either through the fabric composite or through the closure.

Figure 8A:
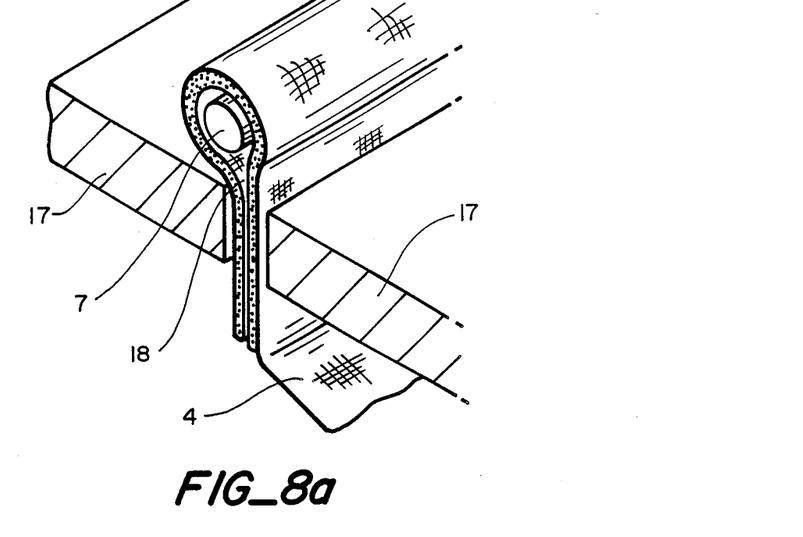
FIGS. 8a and b show a technique for forming a rail at an edge region of a recoverable sheet.
Figure 8B:
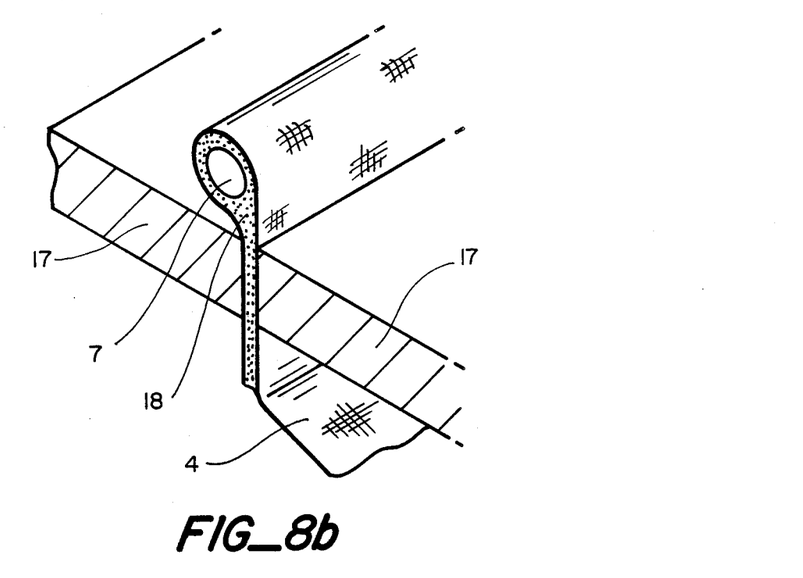

FIGS. 8a and b show an inventive technique for forming a closure element at an edge region of a recoverable fabric or continuum. An edge of a recoverable sheet 4 is folded over around a support 7 and secured in that folded configuration in a vice or other clamp 17. The support may be a solid rod or series of rod portions or it may be an adhesive coating on the sheet which later flows to fill the loop. A heat-activatable adhesive coating 18 is shown in addition to a support rod 7. The next step is recovery, preferable by heating the loop of recoverable sheet which extends above the vice 17 as drawn. The vice may conveniently act as a heat sink to limit recovery of the sheet to the loop. The loop shrinks and the adhesive is activated forming a tight and effectively solid closure rail at the edge of the sheet. Where no solid rod 7 is provided, the adhesive coating is preferably a thermosetting resin in order that the integrity of the rail is not lost during subsequent heating. The resulting rail has the advantage of being dimensionally stable. This is of considerable benefit in the closure systems illustrated in FIGS. 6 and 7 since no movement of the edge regions of the sheet will occur on recovery during installation. Such movement is undesirable since it can weaken the frictional grip of the channel 3 and lead to pull out of the edge portions of the sleeve.

We claim:

1. A recoverable wrap-around article which comprises a recoverable fabric cover portion, the fabric having a recovery ratio of at least 20%, and edge regions provided with a mechanical closure for maintaining the edge regions in proximate relationship during recovery of the cover portion.

2. An article according to claim 1, in which first and second closure elements are provided on first and second edge regions respectively, the elements being interengagable by virtue of co-operating surfaces thereof.

3. An article according to claim 1, in which the mechanical closure includes one or more discrete clamping elements which can hold together first and second closure elements at first and second edge regions of the fabric.

4. An article according to claim 3, in which the first and second closure elements are each substantially continuous along respectively the first and second edge regions.

5. An article according to claim 2, in which the first and second closure elements each comprise a plurality of closure members spaced along respectively the first and second edge regions.

6. An article according to claim 2, in which recoverable fibres run from the first edge region to the second edge region, and at each said edge region turn back around the closure elements towards the other said edge region, thus trapping the closure elements.

7. An article according to claim 6, in which the fabric is woven and contains a substantially continuous, recoverable weft.

8. An article according to claim 6, in which the closure elements are formed by folding over edge portions of the fabric and trapping supports in the folds.

9. An article according to claim 6, in which the fabric is at least partially of multiple thickness forming regions of closed cross-section which trap the closure elements.

10. An article according to any preceding claim 1, in which the fabric has at each said edge region a polymeric material which prevents relative movement between its fibres.

11. An article according to claim 1, in which the fabric is coated with a sealing material on a surface that is inwardly facing when the edge regions are brought together.

12. An article according to claim 11, in which the sealing material is a heat-activatable adhesive.

13. An article according to claim 1, in which the fabric comprises a weave having the recoverable fibres running in one direction and non-recoverable fibres running in a transverse direction.

14. An article according to claim 13, in which the non-recoverable fibres are substantially non-extensible.

15. An article according to claim 13, in which the fabric is woven, and has a recoverable warp and non-recoverable weft.

16. An article according to claim 1, in which the fabric has associated therewith means for rendering it substantially impervious to air when recovered.

17. An article according to claim 16, in which the means for rendering the fabric substantially impervious comprises a polymeric material adhered to at least one surface of the fabric or a polymeric matrix through which the fabric extends.

18. An article according to claim 1, in which the recoverable fibres are dimensionally stable at said edge regions.

19. An article according to claim 1, which additionally comprises a flap which can underlie the first and second edge regions when brought together.

20. An article according to claim 19, in which the flap comprises a portion of the fabric between one of the edge regions and an adjacent edge of the fabric.

21. An article according to claim 1, in which the fibres are heat-recoverable, and which additionally comprises a temperature indicating means.

22. An article according to claim 1, in which two areas of recoverable fabric are joined together along a line by means of a mechanical joining arrangement that penetrates the fabric.

23. An article according to claim 1, in which the mechanical joining arrangement comprises stitches or staples.

24. An article according to claim 1, in which the fabric cover portion has the form of a wrap-around sleeve.

25. A heat-recoverable wraparound article which comprises a recoverable fabric cover portion, the fabric having a recovery ratio of at least 20%, and edge regions (8) provided with a mechanical closure (3,7,9) for maintaining the edge regions (8) in proximate relationship during recovery, wherein the article comprises a recoverable fabric in which recoverable fibres (6) run from the first edge region (8) to the second edge region (8), and at each said edge region (8) turn back around the closure elements (7) towards the other edge region (8), thus fixedly trapping the closure elements (7); and wherein the mechanical closure is selected from the group consisting of one or more discrete clamping elements which can hold together first and second closure elements at first and second edge regions of the article or the mechanical closure comprising first and second closure elements (3,7,9) provided on first and second edge regions respectively, the elements being interengageable by virtue of cooperating surfaces thereof.

26. An article according to claim 25 in which the first and second closure elements (3,7,9) are each substantially continuous along respectively the first and second edge regions.

27. An article according to claim 25 in which the first and second closure elements (3,7,9) each comprises a plurality of closure members spaced along respectively the first and second edge regions.

28. An article according to claim 25 in which the fabric (4) is woven and contains a substantially continuous, recoverable weft (6).

29. An article according to claim 28 in which the closure elements (7) are formed by folding over edge portions of the fabric and fixedly trapping supports (7) in the folds.

30. An article according to claim 28 in which the fabric is at least partially of multiple thickness forming regions of closed cross-section (13) which trap the closure elements.

31. An article according to claim 29 in which the fabric (4) has at each said edge region a polymeric material which prevents relative movement between its fibres.

32. An article according to claim 31 in which the fabric (4) is coated with a sealing material (8) on a surface that is inwardly facing when the edge regions are brought together.

33. An article according to claim 32 in which the sealing material (18) is heat-activatable adhesive.

34. An article according to claim 25 in which the fabric comprises a weave having the recoverable fibres running in one direction (6) and non-recoverable fibres (5) running in a transverse direction.

35. An article according to claim 34 in which the non-recoverable fibres (5) are substantially non-extensible.

36. An article according to claim 35 in which the fabric is woven, and has a recoverable warp and non-recoverable weft.

37. An article according to claim 36 in which the fabric has associated therewith means for rendering the fabric substantially impervious to air when recovered, said means comprising a polymeric material adhered to at least one surface of the fabric or a polymeric matrix through which the fabric extends.

38. An article according to claim 37 in which the recoverable fibres (6) at said edge regions have been recovered and are therefore dimensionally-stable.

39. An article according to claim 38 which additionally comprises a flap (15,16) which can underlie the first and second edge regions (8) when brought together.

40. An article according to claim 39 in which the flap (15) comprises a portion of the fabric between one of the edge regions and an adjacent edge of the fabric.

41. An article according to claim 34 in which the fabric is woven, and has a recoverable warp and non-recoverable weft.

42. A method enclosing a substrate, which comprises wrapping around the substrate an article according to claim 1, securing the first and second edge regions together, and causing recovery of the fibres.

43. A method according to claim 42, in which the substrate is a supply line.

44. A method according to claim 43, in which the supply line comprises a telecommunications cable.

45. A method of forming a closure member at an edge portion of a sheet having at least a component of recoverability perpendicular to said edge region, which comprises:
  folding over an edge of the sheet to form a loop at said edge region;
  securing said fold by holding together the resulting double thickness of sheet;
  positioning a support within the loop; and
  causing recovery of that part of the sheet which forms the loop, thereby trapping the support.

46. A method according to claim 45, in which the sheet has a coating of adhesive on an internal surface of the loop, which adhesive is activated on recovery of the part of the sheet which forms the loop.

47. A method of forming a wrap-around sheet which comprises forming at opposing edge regions of the sheet a closure member by a method according to claim 45.

48. A method according to claim 45, in which the sheet is a recoverable fabric.

49. A method according to claim 45 in which the sheet comprises a recoverable composite structure comprising a recoverable fabric and a polymeric matrix.

50. A method according to claim 48 in which the sheet comprises a recoverable composite structure comprising a recoverable fabric and a polymeric matrix.

* * * * *

UNITED STATES PATENT AND TRADEMARK OFFICE
CERTIFICATE OF CORRECTION

PATENT NO. : 4,940,820

DATED : July 10, 1990

INVENTOR(S) : Kenneth B. Pithouse et al

It is certified that error appears in the above-identified patent and that said Letters Patent is hereby corrected as shown below:

On the title page item [73] Assignee: Please change the Assignee to:
--Raychem Corporation, Menlo Park, Calif.--.

Before item [57] please change the Attorney, Agent, or Firm to:
--A. Stephen Zavell, Herbert G. Burkarh--.

Column 17, claim 4, line 47, delete "3" and insert --2--.

Signed and Sealed this

Fifth Day of May, 1992

Attest:

DOUGLAS B. COMER

Attesting Officer

Acting Commissioner of Patents and Trademarks